US012517275B2

(12) United States Patent
Ravilly et al.

(10) Patent No.: US 12,517,275 B2
(45) Date of Patent: Jan. 6, 2026

(54) SUBMARINE EXPLORATION SYSTEM COMPRISING A FLEET OF DRONES (71) Applicant: Abyssa, Bassussarry (FR)

(72) Inventors: Morgane Eliane Aline Ravilly, La Rochelle (FR); Michel Philippe Colinet, Saint Germain de Belves (FR)

(73) Assignee: ABYSSA, Anglet (FR)

( * ) Notice: Subject to any disclaimer, the term of this patent is extended or adjusted under 35 U.S.C. 154(b) by 569 days.

(21) Appl. No.: 17/765,674

(22) PCT Filed: Sep. 30, 2020

(86) PCT No.: PCT/EP2020/077407
§ 371 (c)(1),
(2) Date: Mar. 31, 2022

(87) PCT Pub. No.: WO2021/064044
PCT Pub. Date: Apr. 8, 2021

(65) Prior Publication Data
US 2022/0365238 A1    Nov. 17, 2022

(30) Foreign Application Priority Data

Oct. 1, 2019 (FR) .................................... 1910850
Oct. 1, 2019 (FR) .................................... 1910851
Oct. 1, 2019 (FR) .................................... 1910852

(51) Int. Cl.
*G01V 1/38* (2006.01)
*B63G 8/00* (2006.01)

(52) U.S. Cl.
CPC .......... *G01V 1/3817* (2013.01); *G01V 1/3808* (2013.01); *G01V 1/3843* (2013.01); *B63G 2008/004* (2013.01)

(58) Field of Classification Search
None
See application file for complete search history.

(56) References Cited

U.S. PATENT DOCUMENTS 10,545,253 B2 *  1/2020  Brizard ................... G05D 1/10
11,356,798 B2 *  6/2022  Mueck ................ H04L 41/0659
(Continued)

FOREIGN PATENT DOCUMENTS

CN    103336267 A    10/2013
CN    105319534 A    2/2016
(Continued)

OTHER PUBLICATIONS

International Search Report for corresponding PCT Application No. PCT/EP2020/077407 mailed Jan. 21, 2021.

*Primary Examiner* — Jonathan M Dager
*Assistant Examiner* — Laura E Linhardt
(74) *Attorney, Agent, or Firm* — Wood, Phillips, Katz, Clark & Mortimer (57) ABSTRACT The invention concerns a submarine exploration system (1) comprising: a master submarine drone (2) designed to move autonomously according to a predetermined flight plan (E) and comprising a communication module (C) for transmitting communication signals; a plurality of follower submarine drones (31, 32, 33, 34, 35, 36), each comprising at least one magnetic field detection system (D), each follower drone further comprising a communication module (C) for receiving communication signals from the master drone; the master drone being designed to transmit navigation instructions (I) to the follower drones and each follower drone being designed to move autonomously depending on the movement instruction such that its movement is slaved to the movement of the master drone.

10 Claims, 6 Drawing Sheets (56) References Cited

U.S. PATENT DOCUMENTS

2014/0321236 A1* 10/2014 Lelaurin ................ G01C 21/20
367/129
2019/0283848 A1* 9/2019 Guevel ................... B63G 8/24

FOREIGN PATENT DOCUMENTS

| CN | 105510878 A | 4/2016 | | |
|----|-------------|--------|----|----|
| WO | WO-2012052564 A1 | * | 4/2012 | ............ B63G 8/001 |
| WO | 2016038453 A1 | 3/2016 | | |

* cited by examiner

| F | I | G | S1 | G | S2 | G | M | G | S3 | G | S4 | G | M | G | S5 | G | S6 | G | E |
|---|---|---|----|---|----|---|---|---|----|---|----|---|---|---|----|---|----|---|---|
| 2 | Cm, GF | | | | | | Cm, GF | | | | | | Cm, GF | | | | | | E |
| 31 | | | P1, E1 | | | | | | | | | | | | | | | | |
| 32 | | | | | P2, E2 | | | | | | | | | | | | | | |
| 33 | | | | | | | | | P3, E3 | | | | | | | | | | |
| 34 | | | | | | | | | | | P4, E4 | | | | | | | | |
| 35 | | | | | | | | | | | | | | | P5, E5 | | | | |
| 36 | | | | | | | | | | | | | | | | | P6, E6 | | |

SUBMARINE EXPLORATION SYSTEM COMPRISING A FLEET OF DRONES

The invention relates to the field of submarine exploration. More precisely, the invention relates to the exploration of deep sea beds using a fleet of submarine drones.

The deep sea beds comprise sites of significant mining potential. Indeed, the hydrothermal activity in the region of the oceanic ridges has for example contributed to creating hydrothermal sites, such as polymetallic sulfide masses, rich in metals, and in particular in zinc, silica, copper and lead, and generally enriched with gold and silver.

Despite their potential, these sites are not yet exploited. On the one hand, the depth at which these sites are located, beyond 800 m, indeed at more than 4000 m, mean that conventional techniques of submarine exploration are unsuitable. On the other hand, the small dimensions of these sites, of 10 to 500 meters in radius, with respect to the extremely extensive ocean surface in which they may be found, renders complex the exploration of said surface in order to identify them. Finally, not all these sites are able to be exploited. Indeed, some sites are referred to as inactive, i.e. cold and presumed to have a low biodiversity, and other sites are referred to as active, i.e. hot and having oases of life. It goes without saying that the active sites must be excluded from any exploitation, in order to preserve the marine ecological environment. However, the current techniques for site discovery are essentially based on the detection of hydrothermal plumes present in the column of water, which are associated only with active sites, and are therefore ineffective for locating inactive sites.

There is thus a need for a solution for the exploration of deep sea beds in order to identify sites having mineral potential, which is effective and quick, and which makes it possible to detect active sites and inactive sites.

In the field of submarine exploration, a known solution consists in using a plurality of autonomous submarine drones, also referred to as AUVs (Autonomous Underwater Vehicles), which are provided with sensors which make it possible to detect sites of mineral potential, the drones forming a fleet which covers the sea beds. These drones, which are capable of moving autonomously according to a given flight plan, have the disadvantage of being extremely costly, in particular on account, on the one hand, of the precision of the navigation systems that they use and, on the other hand, on account of the large number of onboard sensors.

However, in order to allow for effective exploration of the sea beds, it is necessary to use a multiplicity of drones, each covering a portion of the surface to explore, so as to reduce the exploration time. These limitations thus make effective, rapid, and low-cost exploration of deep beds impossible. Furthermore, the onboard sensors in said drones do not make it possible to detect the inactive sites.

The invention falls within the scope of this context, and aims to overcome the problems identified, by proposing a solution for exploration of deep sea beds which meets the requirements of speed, effectiveness, and detection of active and inactive sites, while maintaining a reasonable exploration cost.

For this purpose, the invention relates to a submarine exploration system, comprising:
a. a master submarine drone arranged so as to move autonomously according to a predetermined flight plan and comprising a communication module for transmitting communication signals;
b. a plurality of follower submarine drones, each comprising at least one magnetic field detection system, each follower drone further comprising a communication module for receiving communication signals from the master drone.

According to the invention, the master drone is arranged to transmit navigation instructions to the follower drones, and each follower drone is arranged so as to move autonomously depending on said movement instruction such that its movement is slaved to the movement of the master drone.

It is thus understood that only the master drone requires accurate navigation equipment in order to move in accordance with its flight plan, the follower drones being limited to following the master drone in its movement. Thus, the equipment of the follower drones can be simplified, which reduces the cost thereof. In addition, it has been found that the hydrothermal sites having mineral potential, such as the sulfurized masses, have a significant magnetic signature having sea bed magnetic anomalies, the peak-to-peak amplitude of which exceeds several hundred to thousands of nanoTeslas. Moreover, said magnetic signature is persistent, even after the hydrothermal activity has ceased, as in the case of inactive sites. On account of this persistence, the use of magnetic field detection systems in the follower drones thus makes it possible to detect magnetic anomalies which may just as well be active sites as inactive sites. The master drone can furthermore have on board other types of sensors which make it possible, following detection of a magnetic anomaly, to characterize the source of the magnetic anomaly, and in particular to distinguish whether it is an active or an inactive site.

A "submarine drone" means any type of vehicle which is capable of moving autonomously under the water.

Advantageously, the communication modules of the master and follower drones are acoustic communication modules. In other words, the data transmitted by the communication module of each of the master and follower drones are for example coded by frequency modulation of an acoustic signal transmitted by said communication module. If applicable, the master drone may be arranged so as to periodically transmit navigation instructions to all the follower drones, each follower drone being arranged so as to move in accordance with the last instruction received, until the following instruction is received. The periodicity over a short period, for example 6 seconds, of the transmissions of the navigation instructions by the master drone makes it possible to ensure that the movement of the follower drones is slaved to the movement of the master drone over a short distance, for example over a distance of less than 15 meters, so as to prevent too much drive, and thus to increase the robustness of the system.

Advantageously, the master drone is arranged so as to periodically determine, from a flight plan, a heading to steer and a formation geometry of the follower drones, each navigation instruction transmitted by the master drone to all the follower drones comprising said heading to steer and said formation geometry. If applicable, each follower drone is arranged, upon receipt of each navigation instruction, so as to move in a direction in accordance with said heading to steer, and to determine and adopt a relative position with respect to the master drone, in accordance with said formation geometry, until the following navigation instruction is received. For example, the predetermined flight plan may define a plan of navigation lines as well as a formation geometry, which are suitable for the exploration of a given zone under conditions relating to the master and follower drones, the master drone being arranged so as to determine said heading to steer, from the plan of navigation lines, and by means of its own position on said plan of navigation lines. "Formation geometry" means a set of relative positions of the master and follower drones, and may for example include, for each follower drone, its spatial position with respect to the master drone, i.e. to the left or to the right, in front or behind, as well as the lateral distance separating said follower drone from the master drone.

According to an example, the formation geometry may consist in a formation of master and slave drones in a comb shape, centered on the master drone, the follower drones being distributed on either side of the master drone and being regularly spaced apart by 100 m. In this formation, it is understood that the master and follower drones move progressively and simultaneously, according to the transmission and the reception of the navigation instructions, according to parallel lines as defined in the navigation lines plan of the flight plan, while complying with the formation geometry defined by the master drone. The movements take place for example at a flight altitude of 100 m above the bed, and at a navigation speed of from 3 to 4 knots. This recognition strategy represents a good compromise between the aims of detection and the need for effectiveness and speed.

According to an example, the master drone and each follower drone comprise a memory, a plurality of formation geometries being loaded into each of the memories, and each formation geometry being associated with a formation code identifying said geometry. If applicable, the navigation instructions transmitted by the master drone contain the formation code that identifies the formation geometry determined by the master drone, and each follower drone is arranged so as to determine its relative position, with respect to the master drone, by selecting the formation geometry loaded into its memory and associated with said transmitted formation code.

In an embodiment of the invention, each follower drone comprises a navigation system which is arranged so as to determine a position of the follower drone at a given moment, and to move from said determined position depending on the navigation instruction received from the master drone. The follower drone may in particular be arranged so as to move, from said determined position, according to the heading to steer, and in a manner maintaining its relative position with respect to the master drone, as defined in the formation geometry of the navigation instruction transmitted by the master drone. For example, the navigation system may comprise instruments for measuring the attitude of the follower drone at a given moment, and in particular an attitude unit of the MEMS (Micro Electro Mechanical System) type, in particular making it possible to obtain information relating to the rolling and to the pitching of the follower drone, and a magnetometer making it possible to obtain a magnetic heading of the follower drone. The position of the follower drone at the given moment can thus be estimated by the navigation system depending on its attitude measured by said measuring instruments, the navigation instruction received, and from the last position estimated. This type of system, performing "dead reckoning" navigation, offers a satisfactory compromise between the precision of estimation of the position of the follower drone, and the cost of the navigation system.

Advantageously, the navigation system of each follower drone is arranged so as to determine an altitude of the follower drone with respect to the sea bed at a given moment, each follower drone being arranged so as to move while maintaining a constant altitude with respect to the sea bed. It is thus understood that the follower drone is autonomous with regard to the altitude thereof. In the reverse case, complete slaving of the movement of the follower drone, including with regard to the altitude thereof, could lead to collision with a local variation of the sea bed, which would not be taken into account by the flight plan in the region of the master drone. The autonomy of the follower drone with regard to the altitude thus makes it possible to take into account these local variations.

The communication module of each follower drone is preferably arranged to transmit, to the master drone, a signal including said determined position of the follower drone.

Advantageously, the communication module of each follower drone is arranged so as to transmit, to the master drone, a signal including said determined position of the follower drone and an operating state of the follower drone, the master drone being arranged so as to determine, from the operating state of the follower drones, said heading to steer and said formation geometry. For example, each follower drone is arranged so as to determine the operating state thereof, i.e. a viable state or a failure state. If applicable, in the event of a failure, each follower drone can be arranged so as to leave the formation and rejoin a base. Advantageously, upon reception of a signal comprising a failure state of a follower drone, the master drone may be arranged so as to determine a new formation geometry suitable for the follower drones which are in a viable state.

Indeed, in the event of a failure of a follower drone, the exploration of the region to explore by the formation of drones comprises a recording gap corresponding to the zone as yet unexplored by the failed follower drone. In order to overcome this gap, the master drone may determine a new flight plan, i.e. a new plan of navigation lines and/or a new formation geometry. For example, in the event of failure of a failed drone in a comb-shaped formation geometry, the master drone could determine a new formation geometry in which a viable follower drone, located at the end of the comb, takes the place of the failed follower drone, and a new navigation line plan in which the navigation lines are narrowed. The new flight plan could for example be selected, depending on the operating states of the follower drones, from a plurality of flight plans stored in a memory of the master drone, each flight plan being for example associated with a given number of viable follower drones.

Advantageously, the communication module of each follower drone can be arranged so as to receive an echo of the signal transmitted by the communication module of the follower drone to the master drone, and reflected by the master drone, and to determine, from said echo, a relative distance separating the follower drone from the master drone. If applicable, the navigation system of the follower drone is arranged to determine said position of the follower drone at said given moment, by means of the determined relative distance. The follower drone thus determines its relative distance from the master drone by echolocation of the master drone by means of the signal which the follower drone transmits.

The navigation system of each follower drone can thus function, alternately, in a navigation mode referred to as "dead reckoning," according to which only its attitude and the received navigation instruction are used to estimate its position at said given moment, from its last estimated position, and in a mode referred to as "in contraction," which takes place upon each transmission of a signal by its communication module, and according to which its relative distance from the master drone is integrated in the determination of its position at said given moment. This integration makes it possible to correct drifts which may occur during the dead reckoning navigation mode and which may bring about a deviation in the relative positioning of the follower drone with respect to the master drone. For example, the relative distance with respect to the master drone, determined by echolocation, can be used in the determination of the position at said given moment, by comparing it to the relative distance fixed by the formation geometry determined by the master drone. In the event of drift, the follower drone may correct its movement so as to move in accordance with the heading to steer, while resuming its relative position with respect to the master drone, as defined in the formation geometry of the navigation instruction received from the master drone.

In an embodiment of the invention, the master drone comprises a navigation system which is arranged so as to determine a position of the master drone at a given moment, and a memory into which the flight plan is loaded, the master drone being arranged so as to move from its determined position in accordance with the flight plan loaded into its memory. If applicable, the precision of the navigation system of the master drone is greater than the precision of the navigation systems of the follower drones. For example, the navigation system of the master drone may comprise an inertial unit of the FOG type (Fiber Optic Gyroscope), receiving information from an acoustic positioning system such as a DVL (Doppler Velocity Log), and comprising a data processing module that integrates for example an algorithm of the Kalman filter type.

Advantageously, the master drone comprises a plurality of systems of different types for characterizing the sea bed. If applicable, each follower drone comprises a single system for characterizing the sea bed, formed by said magnetic field detection system. The follower drones are thus referred to as single-sensor, and the master drone is referred to as multi-sensor. For example, the master drone may comprise at least two systems for characterizing the sea bed, selected from the following non-limiting list of systems: a magnetic field detection system, a bathymetric mapping system (such as a multibeam bathymetric sounder), an acoustic imaging system (such as lateral scanning sonar), an object detection system (such as a camera), and a system for measuring physical or chemical hydrodynamic parameters. In this way, in the case of detection of a magnetic anomaly by means of the magnetic field detection systems of the follower drones, and optionally of the master drone, the master drone may make it possible to distinguish, by means of systems for characterizing the sea bed, which it comprises, the type of the source of the magnetic anomaly, and in particular whether it is an active or inactive hydrothermal site having mineral potential.

In an embodiment of the invention, the magnetic field detection system of each follower drone comprises a magnetic field sensor which is capable of measuring the magnetic field in the vicinity of the follower drone. If applicable, the system according to the invention may comprise a data processing module which is arranged so as to extract, from the measured magnetic field, a value that is independent of the values of the ambient magnetic field and the follower drone's own magnetic field, and to detect, on the basis of said value, a magnetic anomaly. If applicable, the magnetic field sensor may be what is known as a 3-component vectorial magnetometer, comprising three magnetometers arranged at 90° with respect to one another. This type of magnetometer makes it possible to be freed of some of the effects of the parasitic magnetic fields generated by the follower drone.

Advantageously, the data processing module is arranged so as to correct the total magnetic field measured, so as to extract said value, the correction being performed on the basis of the movement attitude of the follower drone, i.e. its rolling, its pitching, and its heading, and on the basis of the ambient local geomagnetic field. Indeed, it has been observed that the magnetic field measured by the magnetic field sensor is the sum of the magnetic anomalies present locally in the region of the sea bed, the ambient geomagnetic field, and the parasitic magnetic fields associated with the follower drone, i.e. the induced and permanent magnetic fields. However, the induced and permanent magnetic fields generated by the follower drone depend on the movement attitude of the follower drone. Since the follower drone is equipped with a navigation system, the data processing module of the magnetic field detection system can thus recover the data relating to the movement attitude of the follower drone at each moment, and can determine, from said data, the induced and permanent magnetic fields, for example by determining the coefficients of the magnetic susceptibility tensor and the remanent magnetization vector of the follower drone. For example, the value can be extracted by means of the following correction operation:

$$A = H_{mes} - (H_i + H_p) - F, \qquad \text{[Math. 1]}$$

where A represents the extracted value, $H_{mes}$ the magnetic field measured by the magnetic field sensor, $H_i$ the induced magnetic field of the follower drone, $H_p$ the permanent magnetic field of the follower drone, and F the local ambient geomagnetic field.

If applicable, the data processing module of the magnetic field detection system may be arranged so as to detect a magnetic anomaly if the extracted value is greater than a predetermined threshold value.

If desired, the data processing module may be on board in one, several, or indeed each, follower drone. In a variant, the data processing module may be external to the drones of the system according to the invention.

According to an embodiment of the invention, the acoustic communication modules of the master and follower drones are arranged so as to transmit communication signals over a same communication channel. If applicable, the communication modules of the master and follower drones are arranged such that the communication signals transmitted by the master and follower drones, on said communication channel, are multiplexed. If desired, the communication modules of the master and follower drones can be arranged such that the communication signals transmitted by the master and follower drones on said communication channel are temporarily multiplexed. If applicable, the communication modules of the master and follower drones may be arranged so as to transmit modulated acoustic signals on the same carrier frequency or the same frequency band.

Preferably, the communication modules of the master and follower drones are arranged so as to periodically transmit, together, a data frame, each of said communication modules being arranged so as to transmit a communication signal in at least one time period of said data frame, which is attributed thereto. In other words, the communication modules access the communication channel in turn, according to a Time Division Multiple Access (TDMA) technique.

Advantageously, the communication module of the master drone is arranged so as to transmit a navigation instruction to all the follower drones in the first time period of the data frame. It is thus understood that one single instruction, i.e. a heading to steer and a code relating to a formation geometry established on the basis of the flight plan of the master drone, is sent for all the follower drones. If desired, the communication module of the master drone is arranged so as to transmit a plurality of navigation instructions to all the follower drones in a plurality of separate time periods of the data frame, the communication modules of just some of the follower drones being arranged so as to transmit a signal to the master drone in time periods of the data frame located between a first and a second successive time period of the data frame, attributed to the master drone. If applicable, the communication modules of others of the follower drones are arranged so as to transmit a signal to the master drone in time periods of the data frame located between the second and a third successive time period of the data frame, attributed to the master drone. This feature makes it possible to accelerate the transmission of the navigation instructions to the follower drones, so as to reduce their drifts during their movement.

Advantageously, the communication module of each of the follower drones is arranged so as to transmit a signal to the master drone, comprising an item of information relating to its position in a time period of the data frame attributed to it. Preferably, the communication module of each of the follower drones is arranged so as to transmit a signal to the master drone, comprising an item of information relating to its position, and an item of information relating to its operating state, in said time period attributed to it.

Preferably, the communication modules of the master and follower drones are arranged such that a guard time period separates two successive time periods attributed to the communication modules.

Advantageously again, the communication module of the master drone is arranged so as to transmit an item of state information of the submarine exploration system to a remote control unit, in the last time period of the data frame.

According to an embodiment of the invention, the communication modules of the master and follower drones are arranged such that the duration of the time periods attributed to said communication modules is identical for all the communication modules, such that the period of transmission of the navigation instructions by the master drone corresponds to a movement of each of the follower drones that is less than a predetermined threshold distance. For example, the duration of the period for transmission of the navigation instructions is fixed, such that the follower drones can move according to a heading given by the master drone, over a distance of a maximum of 15 meters, at a speed of 3.5 knots.

According to an embodiment of the invention, each follower drone comprises a body comprising a front compartment which is isolated from the rest of the body, and each follower drone comprises a propulsion system, a battery, and the magnetic field detection system is arranged in the front compartment, and the propulsion system and the battery are arranged in the body, outside of the front compartment. The impact of the induced and permanent magnetic fields of the propulsion system and of the battery on the magnetic field detection system is thus limited.

Advantageously, the body is formed of a rear compartment, a central compartment, and the front compartment, each compartment being isolated from the others, and the propulsion system is arranged in the rear compartment and the battery is arranged in the central compartment.

If applicable, the acoustic communication module and/or the navigation system of the follower drone are arranged in the front compartment.

The invention also relates to a method of submarine exploration implemented by a submarine exploration system according to the invention. The method advantageously comprises the following steps:
a. selection of at least one predetermined flight plan by the master drone;
b. autonomous movement of the master drone depending on the selected flight plan;
c. emission, by the master drone, of navigation instructions, determined on the basis of the selected flight plan, to the follower drones;
d. autonomous movement of each of the follower drones according to the received navigation instruction.

If desired, the method may comprise a step of transmission, by each of the follower drones, of a signal, to the master drone, comprising at least one item of information relating to its operating state and, in the event of the master drone receiving a signal from a follower drone comprising an item of information indicating a failure of said follower drone, a step of reconfiguration in which the master drone selects a new flight plan depending on the remaining viable drones.

Advantageously, the method may comprise a step of echolocation of the master drone, performed by each of the follower drones, using the transmitted signal comprising at least one item of information relating to its operating state, and a step of correcting the movement of the follower drone by means of a relative distance with respect to the master drone obtained during the echolocation step.

If desired, the method may comprise a step of measuring the local magnetic field, implemented by each of the follower drones, a step of extracting, from each measured magnetic field, a value that is independent of the ambient magnetic field and of the own magnetic field of the follower drone that measured said magnetic field, and a step of detecting, from said extracted value, a magnetic anomaly.

The invention also relates to a submarine exploration system comprising a master submarine drone and a plurality of follower submarine drones, the movements of which are slaved to the movement of the master drone, each of the master and follower drones comprising an acoustic communication module for transmitting communication signals on the same communication channel, characterized in that the communication modules of the master and follower drones are arranged such that the communication signals transmitted by the master and follower drones on said communication channel are multiplexed.

Indeed, it has been found that the electromagnetic waves propagate with difficulty in water, in particular at the anticipated exploration depths. It is thus preferable to anticipate acoustic communication means between the drones. However, insofar as uplinks and downlinks have to be established between the master drone and each of the follower drones, it is important to provide a solution which makes it possible for each of said links to be established, in a simple and reliable manner, without interfering with the others. It is thus understood that the multiplexing of the acoustic communication signals transmitted by the communication modules of the drones of the system according to the invention makes it possible to establish communication between the drones on the same channel, and thus to easily and reliably establish a quasi-simultaneous enslavement of the movements of all the follower drones to the movement of the master drone.

The invention also relates to a method for communication between a master drone and a plurality of follower drones of a submarine exploration system according to the invention.

The invention also relates to a submarine exploration system comprising a master submarine drone and a plurality of follower submarine drones, the movements of which are slaved to the movement of the master drone, in which each follower drone comprises a propulsion system, a battery, and a magnetic field detection system, and in which the magnetic field detection system is arranged in the front compartment, and the propulsion system and the battery are arranged in the body, outside of the front compartment.

By virtue of the invention, the separation of the various elements of the follower drones into magnetic isolated compartments makes it possible to minimize the impact of the various magnetic field sources on the detection of a magnetic anomaly by the detection system of each follower drone, and in particular the battery and the motor elements.

The present invention will now be described with reference to examples, which are given merely by way of example and in no way limit the scope of the invention, and on the basis of the accompanying drawings, in which.

In the following description, elements which are identical, in terms of structure or function, are provided with the same reference signs in different figures, unless otherwise specified.

Figure 1:
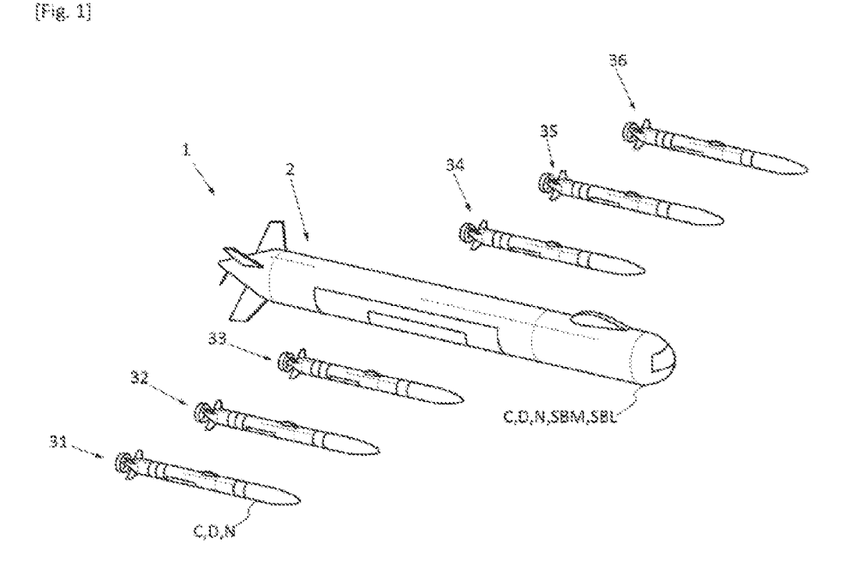
FIG. 1 is a partial schematic view of a submarine exploration system according to an embodiment of the invention.

FIG. 1 is a view of a submarine exploration system 1 according to an embodiment of the invention.

The system 1 comprises a master submarine drone 2 and a plurality of follower submarine drones 31 to 36. The drones 2 and 31 to 36 are submarine drones that are capable of moving autonomously. Each of the master 2 and follower 31 to 36 drones is equipped with a communication module C for transmitting and receiving signals, from a magnetic field detection system D that is capable of measuring a magnetic field and from a navigation system N that is arranged so as to determine a position of the drone at a given moment. Furthermore, and in contrast with the follower drones 31 to 36, the master drone 2 comprises a plurality of systems for characterizing the sea bed, including a bathymetric mapping system in the form of a multibeam bathymetric sounder MBS, and an acoustic imaging system in the form of lateral scanning sonar LSS. The master drone 2 is thus multi-sensor, and the follower drones 31 to 36 are thus single-sensor.

The navigation system N of each of the follower drones 31 to 36 comprises an attitude unit of the MEMS type, which is capable of determining the rolling and pitching of the follower drone. Furthermore, the magnetic field detection system D of each follower drone provides the navigation system N with a magnetic heading. In a variant, it would be possible for each follower drone to be provided with a second magnetic field detection system for providing said magnetic heading, the magnetic field detection system D being, in this case, dedicated to the measurement of the magnetic field. The navigation system N of the master drone 2 comprises an inertial unit of the FOG type, receiving information provided by an acoustic positioning system such as a DVL (Doppler Velocity Log), and comprising a data processing module for the position data, that integrates an algorithm of the Kalman filter type. The precision of the navigation system of the master drone 2 is thus far greater than that of the navigation system of each of the follower drones 31 to 36.

The communication modules C of the master 2 and follower 31 to 36 drones are acoustic communication modules, such that the drones can exchange data in the form of modulated acoustic signals transmitted by said communication modules, on the same communication channel, i.e. on the same wavelength. Furthermore, the acoustic signals transmitted by the master 2 and follower 31 to 36 drones on said communication channel are temporarily multiplexed, such that the communication modules C access the communication channel in turn, according to a Time Division Multiple Access technique, each of the drones thus transmitting an acoustic signal in at least one time period of a periodic data frame which is attributed to it.

Figure 2:
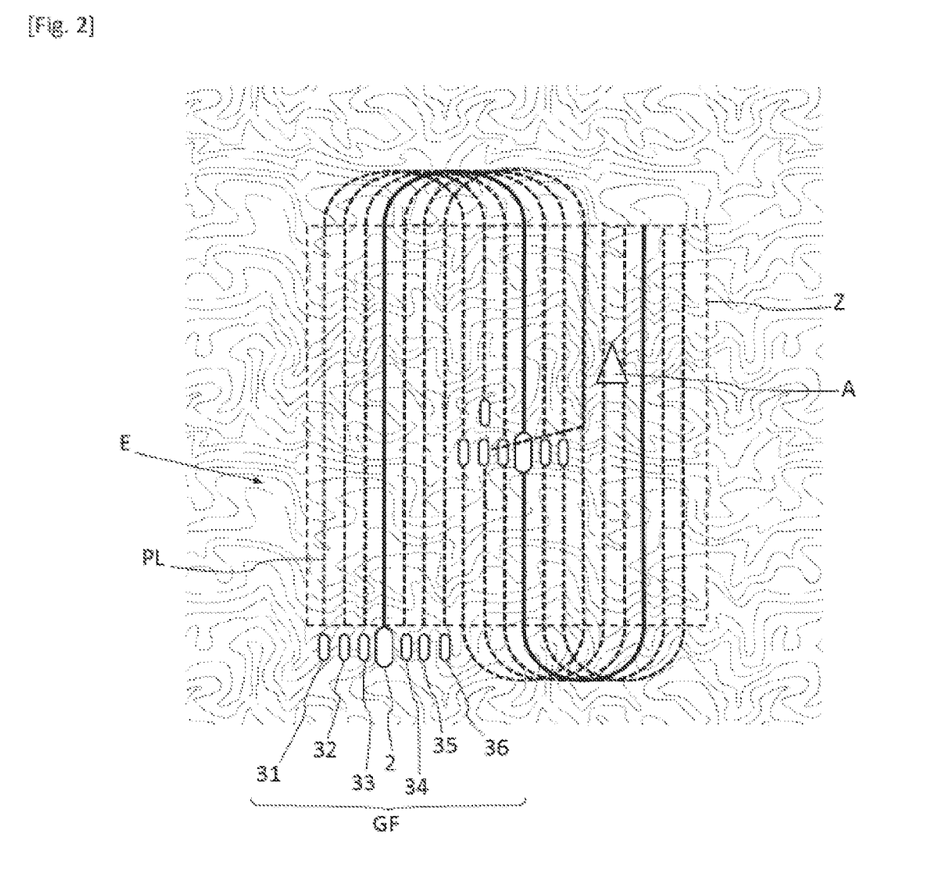
FIG. 2 shows a method of submarine exploration implemented by the submarine exploration system of [FIG. 1]
Figure 3:
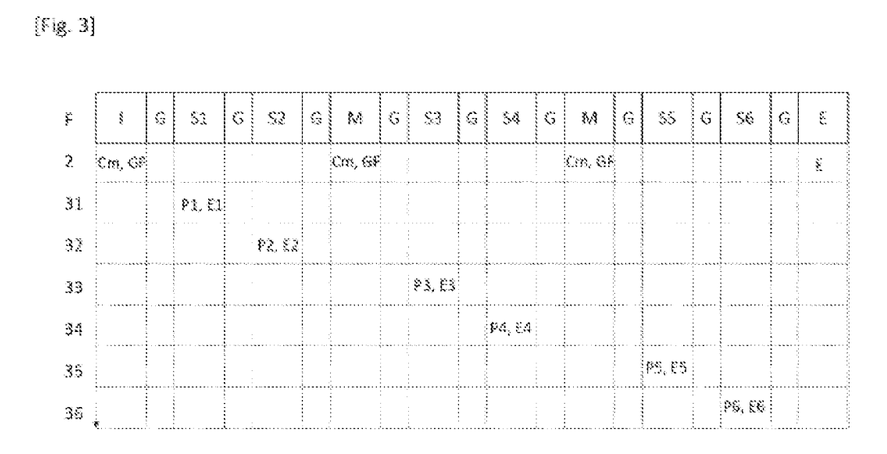
FIG. 3 shows a method of communication between the master and follower drones of the submarine exploration system of [FIG. 1]
Figure 4:
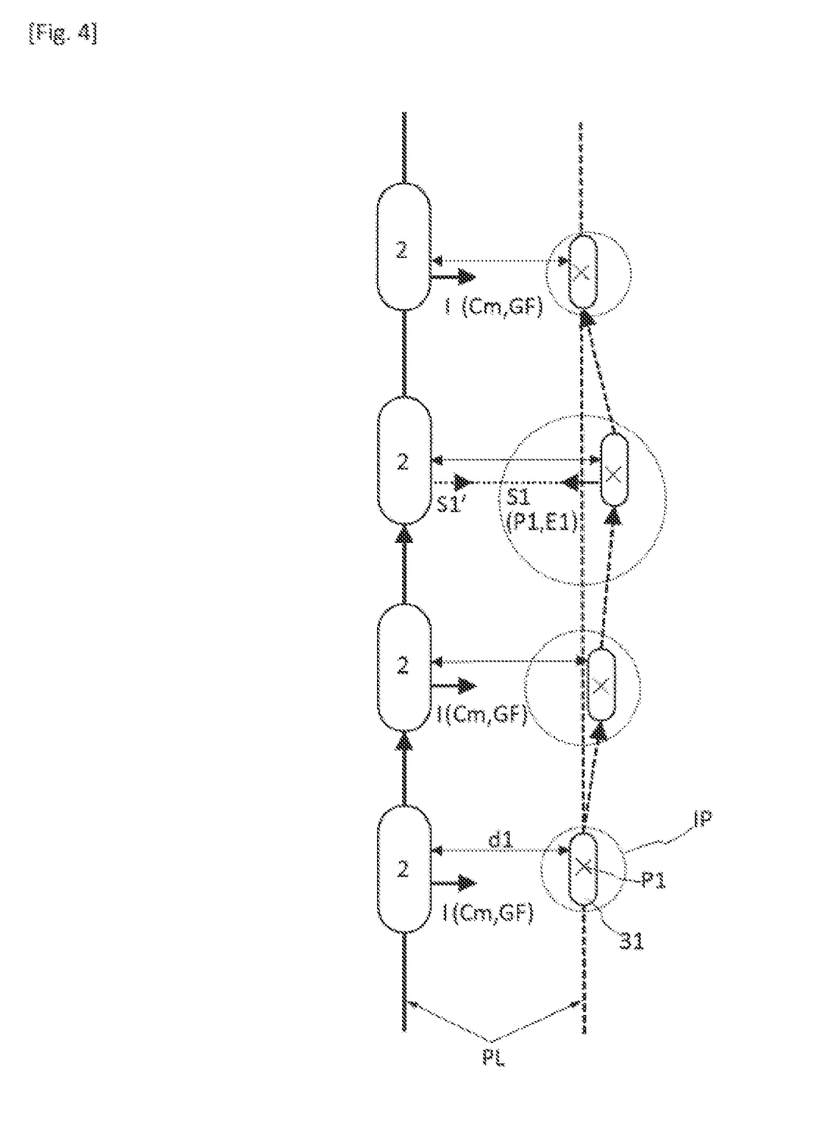
FIG. 4 shows the movements of the master drone and one of the follower drones of the submarine exploration system of [FIG. 1]

FIG. 2 is a plan view of a method for submarine exploration of an exploration zone Z implemented by the exploration system 1, [FIG. 3] shows a method of communication between the master drone 2 and the follower drones 31 to 36 during the exploration, as well as a data frame F which thus moves in the communication channel formed between the drones, and [FIG. 4] shows an example of enslavement of a movement of one of the follower drones 31 to the movement of the master drone 2.

In advance of the exploration, a plurality of formation geometries is loaded into a memory of each of the master 2 and follower 31 to 36 drones. Each formation geometry describes, for a given number of follower drones and for each of said follower drones, its spatial position with respect to the master drone 2, i.e. whether it should be positioned to the left, to the right, in front or behind the master drone 2, and a lateral distance separating said follower drone from the master drone 2. Again prior to the exploration, the master drone selects a flight plan E, i.e. a given formation geometry GF, and a plan of navigation lines PL associated with said formation geometry GF and suitable for the intended exploration zone Z. Each line of the plan of lines PL thus defines the movement of a drone in the exploration zone Z (in solid lines for the master drone 2 and dotted lines for the follower drones 31 to 36 in [FIG. 2]). As described in [FIG. 2], the formation geometry GF defined in the selected flight plan E corresponds to a comb-shaped formation centered on the master drone 2, the follower drones being distributed on either side of the master drone 2 and being regularly spaced apart by 100 m.

The master drone 2 is arranged so as to move autonomously, with the aid of its navigation system N, in accordance with the flight plan E and with its own line in the plan of navigation lines PL. During its movement along the flight plan E, the master drone 2 transmits periodically, for example every 6 seconds, via its communication module C, a navigation instruction I to all the follower drones 31 to 36 comprising a heading to steer Cm, determined from the flight plan E, as well as a code identifying the formation geometry GF defined in the selected flight plan E. A plurality of navigation instructions I are thus transmitted to all the follower drones in a plurality of time periods of the data frame F.

Upon receipt of a navigation instruction I by its communication module C, each follower drone 31 to 36 determines its relative position with respect to the master drone 2, by selecting the formation geometry loaded into its memory and associated with said code contained in the navigation instruction I. Each follower drone 31 to 36 thus moves in an autonomous manner, in accordance with the navigation instruction I received, depending on the heading to steer and on the position of the follower drone estimated by its navigation system N, while maintaining its relative position with respect to the master drone 2, until the following navigation instruction is received. More specifically, each follower drone 31 to 36 adopts a navigation mode referred to as "dead reckoning," in which it estimates its position P1 to P6 depending on its movement, determined by the magnetic heading measured by the magnetic field detection system, and its attitude measured by the attitude unit, on the basis of its last estimated position. The follower drone thus moves towards a new position determined by its estimated position and by the heading to steer Cm contained in the navigation instruction I, and in a manner maintaining its relative position with respect to the master drone 2 defined in the formation geometry GF.

As shown in [FIG. 4], the dead reckoning navigation mode introduces a drift in the movement of each follower drone (illustrated by the follower drone 31) due to the positioning uncertainty introduced by the estimation of the position P1 to P6. In other words, the positioning uncertainty (represented by the circle IP in [FIG. 4]) increases over time, which can result, on the one hand, in a deviation of the follower drone 31 with respect to its line of navigation in the plan of lines PL and, on the other hand, in a difference between the actual lateral distance d1 between the master drone 2 and the follower drone 31, and that fixed in the formation geometry GF.

Each follower drone 31 to 36 transmits a signal S1 to S6 to the master drone 2 containing its estimated position P1 to P6 as well as an operating state E1 to E6, i.e. a viable state or a failure state, in a time period in the data frame F which is attributed to it. In order to overcome the drifts of the movements of the follower drones described above, the communication module C of each follower drone receives an echo S1' of the signal S1 reflected by the master drone 2, and determines, from said echo, the actual relative distance d1 separating the follower drone from the master drone. The follower drone 31 thus passes from the dead reckoning navigation mode to a navigation mode referred to as "in contraction," in which said relative distance d1 determined by echolocation is integrated in the determination of the position of the follower drone by the navigation system N, and in the movement of the follower drone. On the one hand, this determined relative distance d1 makes it possible to reduce the positioning uncertainty. On the other hand, the comparison between the actual relative distance d1 and that fixed in the formation geometry GF allows the follower drone 31 to regain its navigation line, and thus to comply with said formation geometry GF.

In the example described, the navigation instructions I transmitted by the master drone 2 lack any instructions regarding an altitude to follow. Furthermore, the navigation system N of each follower drone 31 to 36 comprises an altimeter which is arranged so as to determine an altitude of the follower drone with respect to the sea bed at a given moment, each follower drone being arranged so as to move while maintaining a constant altitude with respect to the sea bed.

In the example of [FIG. 1], the drone 32 suffers damage and thus sends, in its time period, a signal S2 containing its position P2 and an operating state E2 indicating a failure. Following the sending of the signal S2, the drone 32 is no longer in a state to continue the exploration, and leaves the exploration zone Z, for example to rejoin a base. Upon receipt of the signal S2 indicating the failure state E2 of the follower drone 32, the master drone selects a new flight plan E defining a new formation geometry GF suitable for the remaining follower drones 31 and 33 to 36. In the example described, the follower drone 36 replaces the follower drone 32 and thus assumes its position. In order to maintain homogeneous exploration of the exploration zone Z, the master drone 2 furthermore determines a new plan of navigation lines PL. The master drone 2 thus performs a reconfiguration of the fleet of drones.

As described in [FIG. 4], a guard time period G separates the successive transmission of signals by the master 2 and follower 31 to 36 drones in the data frame F. It will furthermore be noted that the time periods attributed to the follower drones 31 to 36 are distributed among the various time periods attributed to the master drone 2.

Finally, the master drone 2 transmits an item of state information E of the submarine exploration system to a remote control unit, for example located on a boat on the surface of the exploration zone Z, in the last time period of the data frame F.

The duration of the time periods attributed to the communication modules C of the master 2 and follower 31 to 36 drones is identical for all these communication modules. Furthermore, the period of transmission of the navigation instructions I by the master drone is such that the movement of each of the follower drones 31 to 36 between two successive navigation instructions is substantially equal to 15 meters, according to a speed of 3.5 knots. It is thus found that the follower drones 31 to 36 move according to elementary movements of 15 meters according to the flight plan E, which makes it possible to achieve precise enslavement of the trajectory of the follower drones 31 to 36 to that of the master drone 2, while ensuring a robustness of the exploration system 1 in the event of drift or of failure of one of the follower drones.

Figure 5:
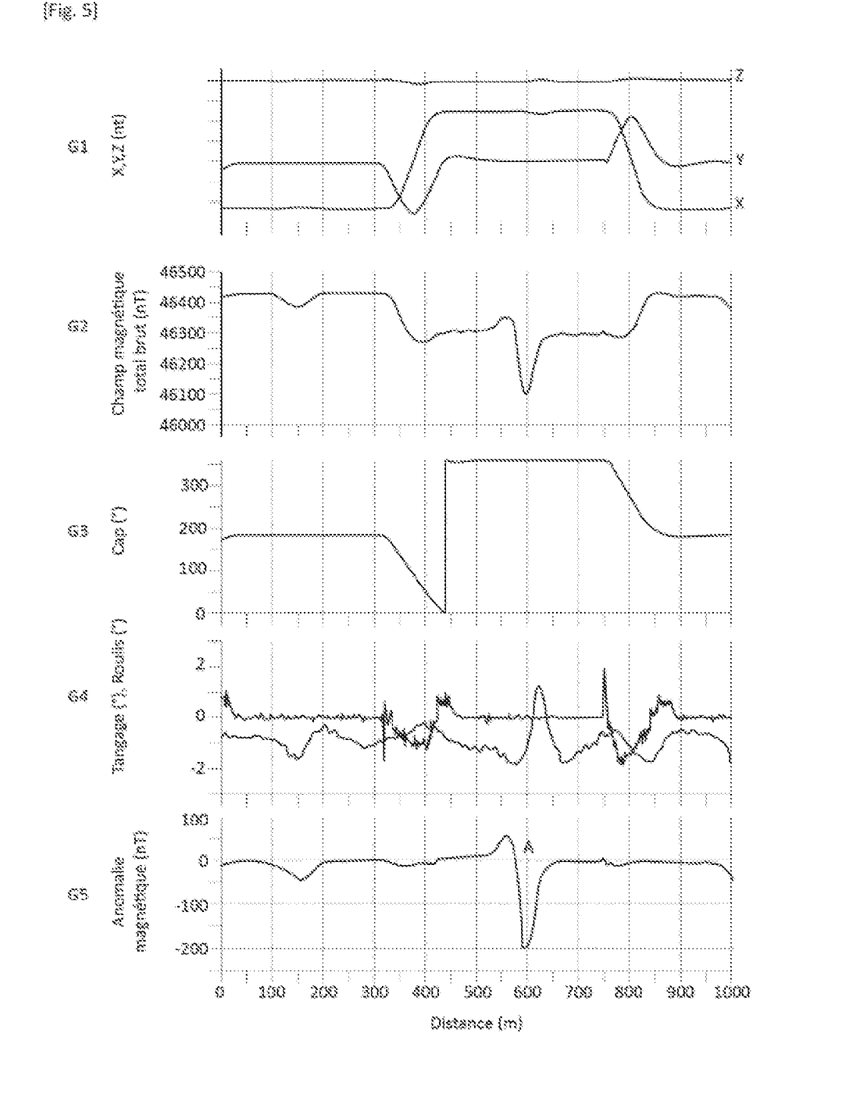
FIG. 5 shows various steps of a method for detecting a magnetic anomaly, implemented by the submarine exploration system of [FIG. 1]

Each magnetic field detection system D of the master 2 and follower 31 to 36 drones comprises a magnetic field sensor, in the form of what is known as a 3-component vectorial magnetometer, comprising three directional magnetometers arranged at 90° with respect to one another, each being capable of measuring the magnetic field in the vicinity of the drone. FIG. 5 thus shows, in the first graph G1, an example of measurements of the three components of the magnetic field, obtained by each of the directional magnetometers of one of the follower drones 31 to 36 during the exploration of the zone Z.

The exploration system 1 comprises a data processing module (not shown), which is external to the drones 2 and 31 to 36 and is arranged so as to calculate a total magnetic field from the measurements of the three components of the magnetic field shown in the graph G1. Said total magnetic field has been shown in the second graph G2.

The data processing module recovers, from the navigation system N during the exploration, the data relating to the movement of the follower drone during the exploration of the zone Z, and in particular its heading which has been shown in the third graph G3, and its rolling and pitching which have been shown in the fourth graph G4. Furthermore, the data processing module determines the magnetic susceptibility tensor of the follower drone, as well as the remanent magnetization vector, for example by means of a magnetic dataset referred to as the calibration dataset. The data processing module corrects, from this set of data, the total magnetic field of the graph G2, in order to eliminate therefrom the induced and permanent magnetic fields as well as the ambient magnetic field, in order to extract therefrom a value shown in the graph G5. It is noted on said graph G5 that the extracted value exhibits a variation, corresponding to a magnetic anomaly A in the exploration zone. Furthermore, the data gathered by the systems for characterizing the sea bed (MBS and LSS), of the master drone, make it possible to characterize the source of the magnetic anomaly A and in particular to determine whether it is an inactive hydrothermal site having mineral potential.

Figure 6:
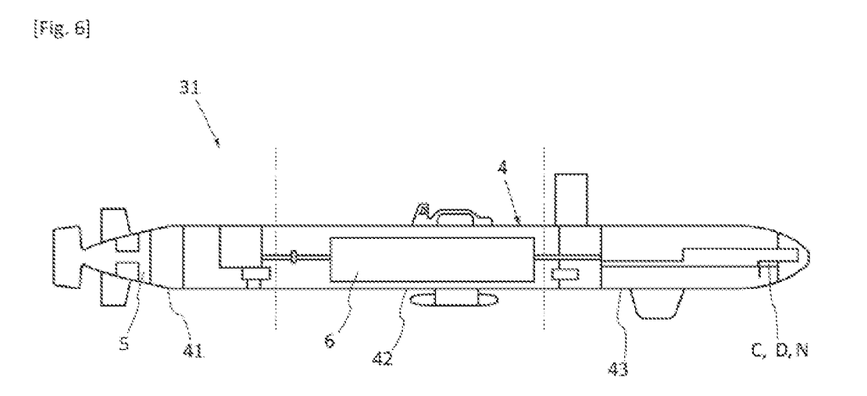
FIG. 6 is a cross-sectional view of a follower drone of the submarine exploration system of [FIG. 1].

Finally, Fig. 6 is a cross section of one of the follower drones 31, it being understood that the structure of all the follower drones 31 to 36 is identical. The drone 31 comprises a body 4 formed of a rear compartment 41, a central compartment 42, and a front compartment 43. Each compartment is isolated from the others.

The follower drone 31 comprises a propulsion system 5 which is arranged in the rear compartment 41, and a battery 6 which is arranged in the central compartment 42. The magnetic field detection system D, the acoustic communication module C, and the navigation system N are arranged in the front compartment 43, so as to limit the impact of the induced and permanent magnetic fields of the propulsion system and of the battery on the magnetic field detection system D.

The description above clearly explains how the invention makes it possible to achieve the aims it has set itself, and in particular by proposing a submarine exploration system made up of a fleet of submarine drones comprising an autonomous master drone and follower drones, the movements of which are slaved to that of the master drone. The system which has been described thus allows for rapid and effective exploration of deep sea beds, making it possible to detect and distinguish the active sties from the inactive sites, and for which the exploration cost is controlled.

In any event, the invention is not limited to the embodiments specifically described in this document, and extends in particular to all equivalent means and to any technically possible combination of said means. In particular, it is possible to envisage other types of formations of the master and follower drones. It is also possible to envisage the use of another type of method for communication between the master and follower drones, other than a TDMA, or indeed an internal structure of the follower drones which is different from that which has been described.

The invention claimed is:

1. An underwater exploration system (1) comprising:
   a. a master submarine autonomous underwater vehicle (AUV) (2) arranged so as to move autonomously according to a predetermined flight plan (E) and comprising at least two seabed characterization systems and a communication module (C) for transmitting communication signals;
   b. a plurality of underwater follower AUVs (31, 32, 33, 34, 35, 36), each comprising at least one magnetic field sensor-detection (D) capable of measuring the magnetic field in the vicinity of the follower AUV, each follower AUV further comprising a communication module (C) for receiving communication signals from the master AUV;
   c. the master AUV being arranged to transmit navigation instructions (I) to the follower AUVs and each follower AUV being arranged so as to move autonomously according to said movement instruction, so that its movement is slaved to the movement of the master AUV,
      in which the master AUV (2) is arranged so as to periodically transmit navigation instructions (I) to all the follower AUVs (31, 32, 33, 34, 35, 36), each follower AUV being arranged to move in accordance with the last instruction (I) received until the next instruction is received, wherein the master AUV (2) is arranged to determine periodically, from a flight plan (E), a course to follow (Cm) and a formation geometry (GF) of the follower AUVs (31, 32, 33, 34, 35, 36), wherein the period of transmission of the navigation instructions (I) by the master AUV (2) is such that the movement of each of the follower AUVs 31 to 36 between two successive navigation instructions is substantially equal to 15 meters at a speed of 3.5 knots; and
      destination of all follower AUVs (31, 32, 33, 34, 35, 36) comprises said heading to be followed and said formation geometry, and wherein each follower AUV is arranged, upon receipt of each navigation instruction, to move in a direction consistent with said course to follow, and to determine and adopt a relative position (d1) with respect to the master AUV consistent with said formation geometry, until the next navigation instruction is received.

2. The system S (1) according to claim 1, wherein the communication modules (C) of the master (2) and follower AUVs (31, 32, 33, 34, 35, 36) are acoustic communication modules.

3. The system (1) according to claim 1, in which each follower AUV (31, 32, 33, 34, 35, 36) comprises a navigation system (N) arranged so as to determine a position (P1, P2, P3, P4, P5, P6) of the follower AUV at a given instant and to move from said determined position as a function of the navigation instruction (I) received from the master AUV (2).

4. The system (1) according to claim 3, in which the navigation system (N) of each follower AUV (31, 32, 33, 34, 35, 36) is arranged to determine an altitude of the follower AUV relative to the seabed at a given time, each follower AUV being arranged to move while maintaining a constant altitude relative to the seabed.

5. The system (1) according to claim 3, in which the communication module (C) of each follower AUV (31, 32, 33, 34, 35, 36) is arranged to transmit to the master AUV (2) a signal (S1, S2, S3, S4, S5, S6) comprising said determined position (P1, P2, P3, P4, P5, P6) of the follower AUV.

6. The system (1) according to claim 1, wherein the communication module (C) of each follower AUV (31, 32, 33, 34, 35, 36) is arranged to transmit to the master AUV (2) a signal (S1, S2, S3, S4, S5, S6) comprising said determined position (P1, P2, P3, P4, P5, P6) of the follower AUV and an operating state (E1, E2, E3, E4, E5, E6) of the follower AUV, the master AUV being arranged so as to determine, from the operating state of the follower AUVs, said course to follow (Cm) and said formation geometry (GF).

7. The system (1) according to claim 5, wherein the communication module (C) of each follower AUV (31, 32, 33, 34, 35, 36) is arranged so as to receive an echo (S1') of the signal (S1) transmitted by the communication module (C) of the follower AUV to the master AUV (2), and reflected by the master AUV and to determine from said echo a relative distance (d1) separating the follower AUV from the master AUV; and in which the navigation system (N) of the follower AUV is arranged to determine said position (P1, P2, P3, P4, P5, P6) of the follower AUV at said given instant using said determined relative distance.

8. The system (1) according to claim 1, in which the master AUV (2) comprises a plurality of systems of different types of seabed characterization systems (SBM, SBL).

9. The system (1) according to claim 1, wherein the system (1) comprises a data processing module which is arranged so as to extract, from the measured magnetic field, a value that is independent of the values of the ambient magnetic field and the follower AUV's own magnetic field, and to detect, on the basis of said value, a magnetic anomaly (A).

10. An underwater exploration implemented by the underwater exploration system (1) according to claim 1.

* * * * *